United States Patent Office 2,719,163
Patented Sept. 27, 1955

2,719,163

AMMONIA TREATMENT OF SYNTHETIC DRYING OILS TO INCREASE VISCOSITY

John L. Ernst and Joseph L. Betts, Jr., Baton Rouge, La., assignors to Esso Research and Engineering Company, a corporation of Delaware No Drawing. Application May 18, 1954,
Serial No. 430,734

16 Claims. (Cl. 260—346.6)

This invention relates to an improvement in spreading properties of certain siccative diolefin polymers. In particular, the invention is concerned with a heat treatment for drying oils prepared by polymerization of butadiene with sodium.

The preparation of synthetic drying oils by polymerizing butadiene-1,3 or especially by copolymerizing 75 to 85% butadiene-1,3 and 25 to 15% styrene with the aid of metallic sodium and in the presence of an inert hydrocarbon diluent, and preferably also in the presence of an ether diluent such as dioxane-1,4 is described and claimed in copending application Serial No. 176,771 of Anthony H. Gleason, filed July 29, 1950. In the manner described a suitable polymeric drying oil can be produced which, when dissolved in an equal quantity of a hydrocarbon solvent such as mineral spirits, generally has a viscosity between about 0.1 and 20 poises, or about 1,000 to 20,000 poises when diluent-free, corresponding to an intrinsic viscosity range of about 0.15 to 0.4. Where the polymeric oil is to be used in higher concentrations, e. g. 70 to 100%, it is obviously desirable that the polymer have a relatively low viscosity, such as 0.5 to 2 poises. The desired viscosity of the polymer can be controlled by an appropriate change in synthesis temperature, oil viscosities in the range between 0.2 and 0.7 poise being obtainable, for example, at reaction temperatures of about 85 to 95° C., whereas oils having viscosities of 1.5 poises, 10 poises or higher can be prepared at temperatures below 50° C. especially with the proper choice of ether type and concentration. However, the resulting low-viscosity oils have been found to be too thin to spread when used in coating compositions. Thus, heretofore the art has been in a dilemma since the choice of synthesizing a high-viscosity polymer ruled out its use in applications requiring the oil to be substantially solvent free or at least in highly concentrated solutions, whereas the choice of deliberately synthesizing a polymer having the desirable viscosity meant a sacrifice in the spreading properties of the product obtained.

U. S. Patent 2,672,425 issued March 16, 1954 to Anthony H. Gleason and Robert F. Leary teaches that a substantial improvement in the drying properties of a sodium polymerized butadiene oil can be obtained by synthesizing the oil to a viscosity lower than the one eventually desired and subsequently heat bodying the oil at a temperature between 175 and 275° C. to the desired final viscosity. However, the viscosity increase by this method is often insufficient to give the desired spreading properties in a reasonable length of time.

U. S. Patent 2,652,342 issued September 15, 1953 to Anthony H. Gleason teaches that the pigment wetting properties of the above synthetic drying oil can be improved by reacting the oil at 50 to 250° C. with .01 to 2.5% maleic anhydride, chloromaleic anhydride, or citraconic anhydride. At temperatures above 175° C. the viscosity is also increased but to no greater degree than that obtained without the maleic anhydride.

In accordance with the present invention the viscosity of a polymer oil is increased by carrying out the bodying in the additional presence of suitable amounts of ammonia at a temperature below 95° C. The final viscosity is determined by the amount of ammonia used, up to 1.0 mole, per mole of maleic anhydride. Any amounts of ammonia above 1.0 mole will have no effect on the viscosity and serves only to increase the reaction rate. Thus the ammonia may be added in quantities between 0.2 and 1.0 mole per mole of anhydride. The oil may be first treated with the anhydride and then heated with the ammonia or the oil may be heated with both simultaneously. Ammonium salts may be used instead of ammonia. The ammonia need not be anhydrous. Aqueous solutions of ammonium hydroxide may be used as well.

The drying oils to which the present invention is primarily applicable are those prepared by copolymerizing 100 to 50 parts of a conjugated diolefin and 0 to 50 parts of a vinyl aromatic. Suitable diolefins include butadiene-1,3, isoprene, piperylene, 2,3-dimethyl butadiene-1,3, 2-methyl pentadiene-1,3. Suitable vinyl aromatics include styrene and its various ring-alkylated homologs, such as the various methyl styrenes, dimethyl styrenes, ethyl styrenes or diethyl styrenes. The polymerization is carried out in a reaction diluent at temperatures ranging from 25–95° C., or preferably between 40 and 85° C., and is desirably continued until complete conversion of monomers is obtained. About 1.2 to 8 parts, preferably 2 to 5 parts of finely divided metallic sodium per 100 parts of monomers are used as catalyst. Materials used as diluents in the polymerization are inert hydrocarbons which remain liquid under the reaction conditions employed. Accordingly, the diluents employed have a boiling point between about −15 and 200° C., the low boiling diluents being useful where it is permissible to keep the reaction pressure sufficiently high to maintain the diluent in liquid condition at the reaction temperature used.

Preferred diluents are essentially aliphatic hydrocarbons such as naphtha having a boiling range between about 90 and 120° C., or straight run mineral spirits such as "Varsol" having a boiling range between about 150 and 200° C. Butane, benzene, cyclohexane and similar inert hydrocarbons are also useful, individually or in admixture with each other. The hydrocarbon diluents are used in amounts ranging from 50 to 500, and preferably 200 to 300 parts per 100 parts of monomers. In other words, the resulting drying oil composition as synthesized normally contains about 20 to 50% of the siccative polymer dissolved in a hydrocarbon solvent. When desired, more concentrated drying oil compositions can be produced from the synthesis product by stripping off excess solvent. For purposes of the present invention, it is desirable to concentrate non-volatile matter, i. e. the polymer content of the drying oil composition, to a concentration between 40 and 100%, preferably 50 to 90%, prior to subjecting it to the treatment with ammonia. The use of less concentrated solutions is also feasible, but a longer heat treating time is required to accomplish a comparable improvement.

Furthermore, to assure the formation of a product of proper clarity, viscosity and drying rate, it is also desirable to employ in the polymerization about 1 to 100 parts, preferably 5 to 50 parts of an ether promoter per 100 parts of monomers. Cyclic diethers of 4 to 8 carbon atoms having an —O— C— C— O— group, such as dioxane-1,4 and its methyl and ethyl homologues, have been found as particularly effective promoters. Other suitable ether promoters are aliphatic mono- or diethers of 4 to 8 carbon atoms such as diethyl ether, ethylal, methyl acetal and tertiary butyl methyl ether. Finally, it is also beneficial to use about 5 to 50 weight percent (based on sodium) preferably 10 to 30 weight percent of an alcohol such as methanol, isopropanol, isobutanol, isopentanol, secondary butanol, tertiary butanol or n-amyl alcohol, especially where the sodium catalyst particles are relatively coarse.

The present invention is based on the discovery that when drying oils containing reacted maleic anhydride of the nature described in U. S. Patent 2,652,342, are heated at temperatures between 20° and 200° C., preferably between 20 and 95° C. in the presence of ammonia the viscosity is greatly increased over that obtained in the absence of the ammonia. For instance the viscosity of a sample of polymer oil containing 1% maleic anhydride and having an initial viscosity of 4 poise (Gardner) at 50% N. V. M. can be increased to 700+ poise by treating with ammonia at room temperature while a sample of oil containing no maleic anhydride shows no increase in viscosity when treated with ammonia under the same conditions.

Since, according to U. S. Patent 2,652,342 the maleic anhydride may be incorporated in the oil at temperatures as low as 50° C., it is possible to heat a polymer oil as prepared in the synthesis in the conjoint presence of the maleic anhydride and ammonia provided the temperature is maintained below 93.33° C., the decomposition temperature of the maleic anhydride-ammonia adduct.

The ammonia-treated product has the appearance of gel yet it is readily soluble in excess "Varsol," and is unstable to heat; when it is heated to above 93.33° C., the ammonia is driven off and the viscosity returns to that of the original oil.

The following specific examples are presented to illustrate typical applications and effects of the present invention. All quantities in this specification and claims are expressed on a weight basis unless stated otherwise.

*Example I*

A polymer oil was synthesized from the following recipe in a continuous process:

| | |
|---|---|
| Butadiene _____parts__ | 80 |
| Styrene _____do____ | 20 |
| Close cut naphtha_____do____ | 200 |
| Ethyl ether_____do____ | 20 |
| Isopropanol _____do____ | 0.3 |
| Sodium _____do____ | 2.1 |
| Temperature _____ | 65° C. |

After cooling to room temperature, the sodium was destroyed by adding glacial acetic acid to the reaction mixture, excess acid was neutralized with ammonia and the salts separated by filtration. After stripping off a portion of the solvent an oil was obtained having a viscosity of 1.3 poises at 50% N. V. M.

*Example II*

A sample of the oil from Example I was heat bodied in the presence of 1% maleic anhydride and with and without the additional presence of an excess of anhydrous ammonia. The following data were obtained:

| Run, Hr. | Gardner Viscosity at 50% N. V. M. Poises ||
|---|---|---|
| | Original Sample | Sample treated with excess NH₃ |
| Up to 193.33° C _____ | 1.3 | 2.3 |
| 1¼ _____ | 1.8 | 20.1 |
| 2⅔ _____ | 1.9 | 50.4 |

A sample of polymer oil containing no maleic anhydride showed no increase in viscosity when treated with excess anhydrous ammonia.

The above data clearly show that the addition of ammonia during the bodying of the oily polymer in the presence of maleic anhydride gives a product having a greatly increased viscosity, 50.4 poises as compared to 1.9 of the bodied product without ammonia addition.

*Example III*

A sample of unbodied polymer oil (83.3% N. V. M.) was mixed with 1% by weight, on polymer, of maleic anhydride and held at 148.89° C.–165.66° C. under reflux for 9 hours. This was sampled throughout the run and viscosities were obtained on the samples and on the same sample treated with an excess of anhydrous ammonia.

| Run, Hr. | Viscosity at 50% N. V. M. ||
|---|---|---|
| | Untreated Sample | NH₃ Saturated Sample |
| 3_____ | 2.0 | 3.1 |
| 4_____ | 2.4 | 3.85 |
| 5_____ | 2.1 | 4.75 |
| 7_____ | 2.4 | 19.0 |
| 9_____ | 2.9 | 110 |

After 9 hours the solution of untreated sample was cooled down, and 1.83 grams of ammonium acetate was added with 243 cc. of Varsol. This mixture was then heated to 93.33° C. for 1 hour to partially effect decomposition of the ammonium acetate. A sample of the resulting polymer oil had a viscosity of 7.0 poise at 50% N. V. M. This compares to 110 poise for a sample saturated with ammonia thus showing that the viscosity can be controlled by controlling the amount of ammonia added. While a good share of this viscosity increase is lost on heating (93.33° C.+) due to the instability of the nitrogen "bridge" formed, it is stable at room temperature and may be used as a viscosity control where viscosity variations are desired for purposes of controlling film thickness, etc.

*Example IV*

A sample of bodied polymer oil containing 1% maleic anhydride having a viscosity of 4.0 poise at 50% N. V. M. was treated with an excess ammonia resulting in a jellylike material having a viscosity of 722 poise at 51% N. V. M. This was diluted to 39.5% N. V. M. (without heating) and the viscosity was 58.3 poise at 39.5% N. V. M. This was further diluted at 28.6% N. V. M. and the viscosity was 4.7 poise.

The above example shows that the addition of ammonia to a polymer oil containing 1% maleic anhydride results in a very viscous material which has the appearance of gel, which, however, is readily soluble in hydrocarbon diluents.

The nature and objects of the present invention having been thus fully set forth and specific examples of the same given, what is claimed as new and useful and desired to be secured by Letters Patent is:

1. A process for improving a synthetic drying oil which comprises, preparing a polymer drying oil of a conjugated diolefin hydrocarbon with sodium as a catalyst in the presence of a diluent to a viscosity below that ultimately desired, then subsequently heating the oil to a temperature below 200° C. in the presence of .01–2.5% of an anhydride selected from the group consisting of maleic, chloromaleic and citraconic anhydride and 0.2 to 1.0 mole of ammonia per mole of anhydride.

2. Process according to claim 1 in which the conjugated diolefin is butadiene-1,3.

3. Process according to claim 1 in which the diolefin is copolymerized with a vinyl aromatic hydrocarbon.

4. Process according to claim 3 in which the diolefin is butadiene-1,3 and the vinyl aromatic is styrene.

5. A process for improving a synthetic drying oil which comprises, preparing a polymer drying oil of a conjugated diolefin hydrocarbon with sodium as a catalyst in the presence of a diluent to a viscosity below that ultimately desired, then subsequently heating the oil to a temperature between 50 and 250° C. in the presence of 0.1 to 2.5% maleic anhydride and finally heating the resulting product at a temperature below 93.33° C. with 0.2 to 1.0 mole of ammonia per mole of maleic anhydride until the desired viscosity is obtained.

6. Process according to claim 5 in which the conjugated diolefin is butadiene-1,3.

7. Process according to claim 5 in which the diolefin is copolymerized with a vinyl aromatic hydrocarbon.

8. Process according to claim 7 in which the diolefin is butadiene-1,3 and the vinyl aromatic is styrene.

9. Process according to claim 8 in which the oily polymer is a copolymer of 80% butadiene and 20% styrene.

10. A process for improving a synthetic drying oil which comprises, preparing a polymer drying oil of a conjugated diolefin hydrocarbon with sodium as a catalyst in the presence of a diluent to a viscosity below that ultimately desired, then subsequently heating the oil to a temperature between 50 and 250° C. in the presence of 0.1 to 2.5% maleic anhydride and finally heating the resulting product at a temperature below 93.33° C. with a sufficient amount of ammonia to give the desired viscosity.

11. Process according to claim 10 in which the conjugated diolefin is butadiene-1,3.

12. Process according to claim 10 in which the diolefin is copolymerized with a vinyl aromatic hydrocarbon.

13. Process according to claim 12 in which the diolefin is butadiene-1,3 and the vinyl aromatic is styrene.

14. Process according to claim 13 in which the oily polymer is a copolymer of 80% butadiene and 20% styrene.

15. A drying oil consisting essentially of a sodium-catalyzed oily copolymer which is composed of the following ingredients in the combined state: 50 to 100% of a conjugated diolefin, 0 to 50% of a vinyl aromatic, 0.01 to 2.5% of an anhydride selected from the group consisting of maleic, chloromaleic and citraconic anhydride, and 0.2 to 1.0 mole of ammonia per mole of anhydride.

16. A drying oil according to claim 15 in which the diolefin is butadiene-1,3 and the vinyl aromatic is styrene.

References Cited in the file of this patent
UNITED STATES PATENTS 2,652,342   Gleason _____ Sept. 15, 1953